(12) United States Patent
Cozma et al.

(10) Patent No.: US 12,524,055 B2
(45) Date of Patent: Jan. 13, 2026

(54) POWER SUPPLY PREDICTIVE FAILURE DETECTION

(71) Applicant: Lenovo Enterprise Solutions (Singapore) Pte. Ltd., New Tech Park (SG)

(72) Inventors: Alexandru Cozma, Bucharest (RO); Jeffery J Van Heuklon, Rochester, MN (US); Vinod Kamath, Raleigh, NC (US); Robert R Wolford, Strongsville, OH (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 301 days.

(21) Appl. No.: 18/204,824

(22) Filed: Jun. 1, 2023

(65) Prior Publication Data

US 2024/0402783 A1 Dec. 5, 2024

(51) Int. Cl.
*G06F 1/30* (2006.01)
*G01D 3/08* (2006.01)
*G08B 21/18* (2006.01)

(52) U.S. Cl.
CPC ............... *G06F 1/305* (2013.01); *G01D 3/08* (2013.01); *G08B 21/185* (2013.01)

(58) Field of Classification Search
CPC .......... G06F 1/305; G01D 3/08; G08B 21/185
USPC .......................................................... 340/635
See application file for complete search history.

(56) References Cited

U.S. PATENT DOCUMENTS 7,693,608 B2 4/2010 Nasle
8,600,685 B2 12/2013 Kalgren et al.

FOREIGN PATENT DOCUMENTS

CN 105359057 A * 2/2016 ............... G06F 1/26

* cited by examiner

*Primary Examiner* — Kam Wan Ma
(74) *Attorney, Agent, or Firm* — Kunzler Bean & Adamson; Bruce R. Needham

(57) ABSTRACT

A method for power supply predictive failure detection is disclosed. The method includes measuring, during a time interval, input power and output power for each of a plurality of loads of a power supply. The method includes calculating, for each of the plurality of loads, a power supply efficiency, each power supply efficiency calculated using the input power and output power measured for the load. The method includes comparing, for the time interval, a calculated power supply efficiency at a load of the plurality of loads with a baseline power supply efficiency of the power supply at a corresponding load. The method includes transmitting an alert in response to determining, based on the comparing, that a difference between a calculated power supply efficiency and a corresponding baseline power supply efficiency is above an efficiency threshold.

20 Claims, 13 Drawing Sheets

POWER SUPPLY PREDICTIVE FAILURE DETECTION

FIELD

The subject matter disclosed herein relates to power supply failure prediction and more particularly relates to methods, apparatuses, and systems for power supply predictive failure detection based on efficiency.

BACKGROUND

Power supplies of servers help servers to operate effectively and reliably. Power supply failure can occur for a variety of reasons. Predicting power supply failure can help to provide continuous power supply to the server.

BRIEF SUMMARY

A method for power supply predictive failure detection is disclosed. An apparatus and system also perform the functions of the method. The method includes measuring, during a time interval, input power and output power for each of a plurality of loads of a power supply. The method includes calculating, for each of the plurality of loads, a power supply efficiency. Each power supply efficiency is calculated using the input power and output power measured for the load. The method includes comparing, for the time interval, a calculated power supply efficiency at a load of the plurality of loads with a baseline power supply efficiency of the power supply at a corresponding load. The method includes transmitting an alert in response to determining, based on the comparing, that a difference between a calculated power supply efficiency and a corresponding baseline power supply efficiency is above an efficiency threshold.

Embodiments of the present disclosure include an apparatus for predictive power supply failure detection. The apparatus includes a measurement module configured to measure, during a time interval, input power and output power for each of a plurality of loads of a power supply. The apparatus includes a calculation module configured to calculate, for each of the plurality of loads, a power supply efficiency. Each power supply efficiency is calculated using the input power and output power measured for the load. The apparatus includes a comparison module configured to compare, for the time interval, each calculated power supply efficiency at a load of the plurality of loads with a baseline power supply efficiency of the power supply at a corresponding load. The apparatus includes a determination module configured to determine, based on the comparison, that a difference between a calculated power supply efficiency and a corresponding baseline power supply efficiency is above an efficiency threshold. The apparatus includes an alert module configured to transmit an alert in response to the determining. At least a portion of the modules include hardware circuits, a programmable hardware device, and/or code. The code is stored on non-transitory computer readable storage media.

A system for predictive power supply failure detection is disclosed. The system includes a power supply and a computing device that includes the power supply. The computing device also includes a measurement module configured to measure, during a time interval, input power and output power for each of a plurality of loads of a power supply. The computing device includes a calculation module configured to calculate, for each of the plurality of loads, a power supply efficiency. Each power supply efficiency is calculated using the input power and output power measured for the load. The computing device includes a comparison module configured to compare, for the time interval, each calculated power supply efficiency at a load of the plurality of loads with a baseline power supply efficiency of the power supply at a corresponding load. The computing device includes a determination module configured to determine, based on the comparison, that a difference between a calculated power supply efficiency and a corresponding baseline power supply efficiency is above an efficiency threshold. The computing device includes an alert module configured to transmit an alert in response to the determining. At least a portion of the modules include hardware circuits, a programmable hardware device, and/or code. The code is stored on non-transitory computer readable storage media.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
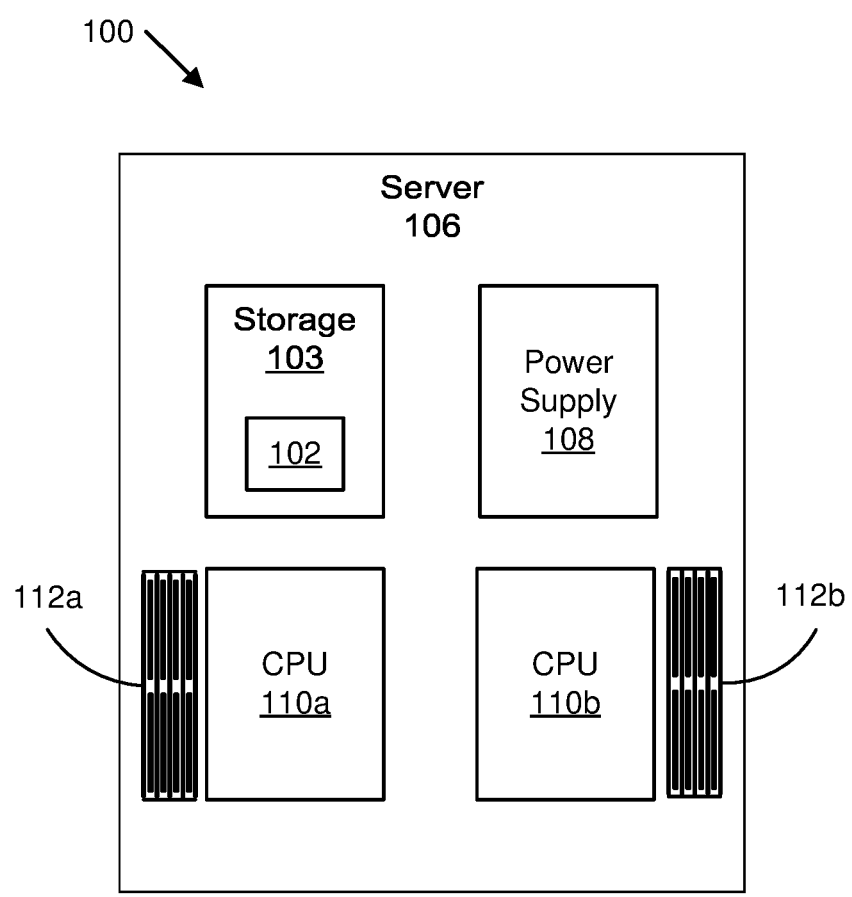
FIG. 1 is a schematic block diagram of a top view a system for predictive power supply failure detection, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R. Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list.

A method for power supply predictive failure detection is disclosed. An apparatus and system also perform the functions of the method. The method includes measuring, during a time interval, input power and output power for each of a plurality of loads of a power supply. The method includes calculating, for each of the plurality of loads, a power supply efficiency. Tach power supply efficiency is calculated using the input power and output power measured for the load. The method includes comparing, for the time interval, a calculated power supply efficiency at a load of the plurality of loads with a baseline power supply efficiency of the power supply at a corresponding load. The method includes transmitting an alert in response to determining, based on the comparing, that a difference between a calculated power supply efficiency and a corresponding baseline power supply efficiency is above an efficiency threshold.

In some examples, the method includes measuring, during a prior time interval, baseline input power and baseline output power for each of the plurality of loads of the power supply. In the examples, the method includes calculating, for each of the plurality of loads, a baseline power supply efficiency. Each baseline power supply efficiency is calculated using the baseline input power and baseline output power measured for the load. In some examples, the method includes receiving the baseline power supply efficiency from a manufacturer of the power supply.

In some examples, each of the plurality of loads are within a range having a minimum load and a maximum load. In some embodiments, the method includes creating an approximated power supply efficiency profile for the range from the calculated power supply efficiencies calculated for each of the plurality of loads throughout the range. In the embodiments, the method includes comparing calculated power supply efficiencies from the approximated power supply efficiency profile with baseline power supply efficiencies of the power supply at corresponding loads. In the embodiments, the method includes transmitting an alert in response to determining that an amount of differences between a calculated power supply efficiency of the approximated power supply efficiency profile and a corresponding baseline power supply efficiency is above an efficiency count threshold.

In some examples, creating the approximated power supply efficiency profile includes creating approximate power supply efficiencies between at least some of the loads of the plurality of loads. Comparing calculated power supply efficiencies from the approximated power supply efficiency profile with corresponding baseline power supply efficiencies includes comparing at least some approximate power supply efficiencies from the approximated power supply efficiency profile with corresponding efficiencies baseline power supply efficiencies.

In some examples, comparing calculated power supply efficiencies from the approximated power supply efficiency profile with corresponding efficiencies from the baseline power supply efficiency of the power supply includes selecting calculated power supply efficiencies of the approximated power supply efficiency profile at a selected interval along the approximated power supply efficiency profile. The selected calculated power supply efficiencies include a power supply efficiency corresponding to a load of the plurality of loads within the range and/or an approximate calculated power supply efficiency. In some examples, creating the approximated power supply efficiencies for the approximate power supply efficiency profile includes using a curve fitting technique based on the calculated power supply efficiencies.

In some examples, the method includes measuring, during a subsequent time interval, subsequent input power and subsequent output power for each of an additional plurality of loads of the power supply throughout the range. In the examples, the method includes calculating, for each of the additional plurality of loads, a subsequent power supply efficiency. Each of the subsequent power supply efficiencies is calculated using the subsequent input power and subsequent output power measured for the load. In the examples, the method includes comparing, for the subsequent time interval, each calculated subsequent power supply efficiency at a load of the additional plurality of loads with the baseline power supply efficiency of the power supply at a corresponding load. In the examples, the method includes transmitting an alert in response to determining, based on the comparing, that a difference between an additional calculated power supply efficiency for the additional plurality of loads and a corresponding baseline power supply efficiency is above an efficiency threshold.

In some examples, the method includes measuring, during the time interval, a plurality of input power values and a plurality of output power values for each of the plurality of loads. In the examples, the method includes calculating, for each of the power supply loads, an average input power and an average output power for the power supply. The calculated power supply efficiency is calculated using the average input power and the average output power for the power supply. In some examples, transmitting the alert is further in response to determining, based on the comparing, that a difference between a predetermined quantity of calculated power supply efficiencies and a predetermined quantity of corresponding baseline power supply efficiencies is above the efficiency threshold.

Embodiments of the present disclosure include an apparatus for predictive power supply failure detection. The apparatus includes a measurement module configured to measure, during a time interval, input power and output power for each of a plurality of loads of a power supply. The apparatus includes a calculation module configured to calculate, for each of the plurality of loads, a power supply efficiency. Each power supply efficiency is calculated using the input power and output power measured for the load. The apparatus includes a comparison module configured to compare, for the time interval, each calculated power supply efficiency at a load of the plurality of loads with a baseline power supply efficiency of the power supply at a corresponding load. The apparatus includes a determination module configured to determine, based on the comparing, that a difference between a calculated power supply efficiency and a corresponding baseline power supply efficiency is above an efficiency threshold. The apparatus includes an alert module configured to transmit an alert in response to the determining. At least a portion of the modules include hardware circuits, a programmable hardware device, and/or code. The code is stored on non-transitory computer readable storage media.

In some examples, the apparatus includes a baseline measurement module configured to, during a prior time interval, measure baseline input power and baseline output power for each of the plurality of loads of the power supply. The apparatus includes a baseline calculation module configured to, for each of the plurality of loads, calculate a baseline power supply efficiency. Each baseline power supply efficiency is calculated using the baseline input power and baseline output power measured for the load.

In some examples, each of the plurality of loads are within a range having a minimum load and maximum load. In the examples, the apparatus includes an efficiency profile module configured to create an approximated power supply efficiency profile for the range from the calculated power efficiencies calculated for each of the plurality of loads throughout the range. In the examples, the apparatus includes an efficiency profile comparison module configured to compare calculated power supply efficiencies from the approximated power supply efficiency profile with corresponding efficiencies from the baseline power supply efficiency of the power supply at corresponding loads. In the examples, the alert module is further configured to transmit an alert in response to determining that an amount of differences between a calculated power supply efficiency of the approximated power supply efficiency profile and a corresponding baseline power supply efficiency is above an efficiency count threshold.

In some examples, the efficiency profile module is further configured to create approximate power supply efficiencies between at least some of the loads of the plurality of loads. In the examples, the efficiency profile comparison module is further configured to compare at least some approximate power supply efficiencies from the approximated power supply efficiency profile with corresponding efficiencies from baseline power supply efficiency. In some examples, the apparatus includes a selection module configured to select calculated power supply efficiencies of the approximated power supply efficiency profile at a selected interval along the approximated power supply efficiency profile. The selected calculated power supply efficiencies include a power supply efficiency corresponding to a load of the plurality of loads within the range and/or an approximate calculated power supply efficiency.

In some examples, the apparatus includes a curve fitting module configured to use a curve fitting technique to create the approximated power supply efficiencies for the approximate power supply efficiency profile based on the calculated power supply efficiencies. In some examples, the measurement module is further configured to measure, during the time interval, a plurality of input power values and a plurality of output power values for each of the plurality of loads. In the examples, the apparatus includes an average calculation module configured to calculate, for each of the power supply loads, an average input power and an average output power for the power supply. The calculated power supply efficiency is calculated using the average input power and the average output power for the power supply.

A system for predictive power supply failure detection is disclosed. The system includes a power supply and a computing device that includes the power supply. The computing device also includes a measurement module configured to measure, during a time interval, input power and output power for each of a plurality of loads of a power supply. The computing device includes a calculation module configured to calculate, for each of the plurality of loads, a power supply efficiency. Each power supply efficiency is calculated using the input power and output power measured for the load. The computing device includes a comparison module configured to compare, for the time interval, each calculated power supply efficiency at a load of the plurality of loads with a baseline power supply efficiency of the power supply at a corresponding load. The computing device includes a determination module configured to determine, based on the comparison, that a difference between a calculated power supply efficiency and a corresponding baseline power supply efficiency is above an efficiency threshold. The computing device includes an alert module configured to transmit an alert in response to the determining. At least a portion of the modules include hardware circuits, a programmable hardware device, and/or code. The code is stored on non-transitory computer readable storage media.

FIG. 1 is a schematic block diagram of a top view of a system 100 for predictive power supply failure detection, according to various embodiments. As illustrated in FIG. 1, the system 100 includes a computing device, such as a server 106. The server 106 includes a failure prediction apparatus 102, storage 103, a power supply 108, one or more CPUs 110a, 110b, and memory 112a, 112b.

The power supply 108 provides power to various components of the server 106, such as the memory 112a, 112b and the CPUs 110a, 110b. In some examples, the server 106 includes other components not shown in FIG. 1, and the power supply 108 also provides power to those components. For example, in some examples, the power supply 108 provides power to a GPU of the server 106.

For various reasons, a power supply 108 may fail. Predicting power supply 108 failure can help to provide a user with enough time to replace the power supply 108 and thus helps to maintain continuity of power to the server 106. The failure prediction apparatus 102 can help to predict failure of the power supply 108 by comparing efficiency levels of the power supply 108 to baseline, ideal, and/or past efficiency levels.

Although not shown in FIG. 1, in some examples, the server 106 includes a baseboard management controller ("BMC"). In such examples, the BMC includes the failure prediction apparatus 102. As such, the operations of the failure prediction apparatus 102 are performed by the BMC rather than, for example, the CPUs 110a, 110b or the memory 112a, 112b of the server 106. In some examples, the BMC is in communication with a remote server and/or cloud server and is configured to transmit data, such as the data shown in FIGS. 5-7 for storage outside of the server 106.

Figure 2:
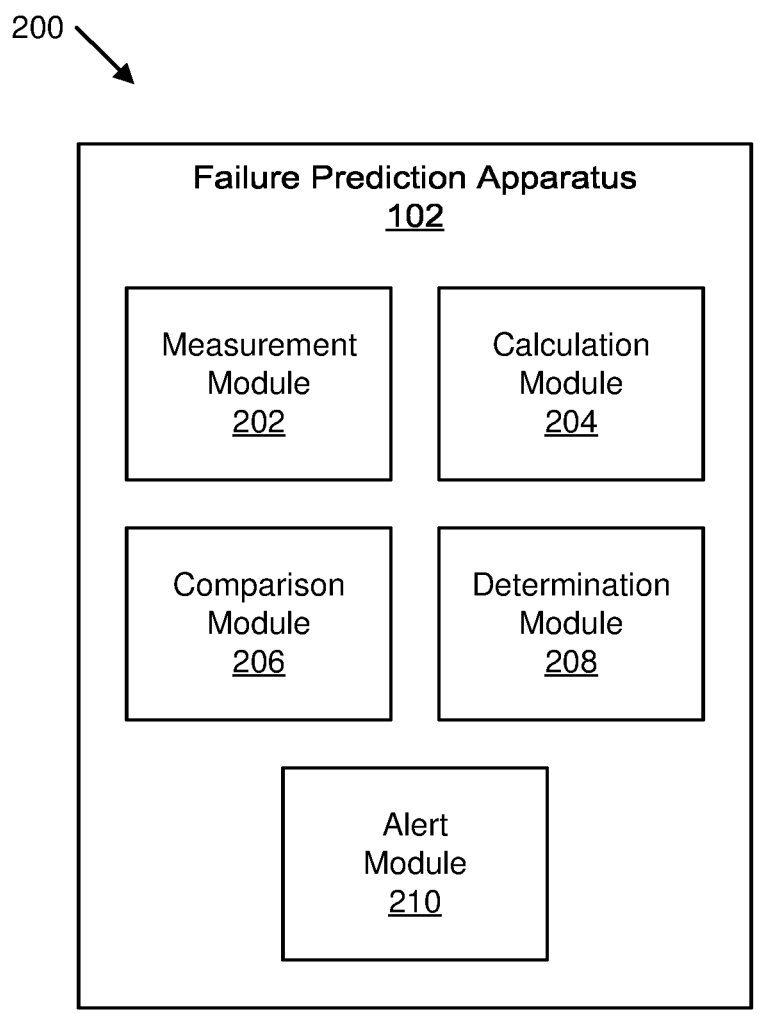
FIG. 2 is a schematic block diagram of an apparatus for predictive power supply failure detection, according to various embodiments.

FIG. 2 is a schematic block diagram of an apparatus 200 for predictive power supply failure detection, according to various embodiments. The apparatus 102 includes a failure prediction apparatus 102 as shown in FIG. 1. The apparatus 200 includes a measurement module 202, a calculation module 204, a comparison module 206, a determination module 208, and an alert module 210, which are described below. In some embodiments, all or a portion of the apparatus 200 is implemented with executable code stored on computer readable storage media. In other embodiments, at least a portion of the apparatus 200 is implemented using hardware circuits and/or a programmable hardware device.

The measurement module 202 is configured to measure, during a time interval, input power and output power for each of a plurality of loads of a power supply 108. The input power is calculated from input voltage of the power supply 108 and a current draw of the power supply 108. The output power is calculated from output voltage of the power supply 108 and output current of the power supply 108. In some embodiments, the measurement module 202 measures input voltage and input current to the power supply 108 and output voltage and output voltage of the power supply 108. In some embodiments, the measurement module 202 uses current sensing circuitry, such as a transformer, a hall-effect sensor, voltage across a resistor, etc. to measure current. In other examples, the measurement module 202 use voltage sensing circuitry, such as a voltage divider, to measure voltage. Where the power supply 108 includes multiple output voltages, in some embodiments, the measurement module 108 measures output voltage and current for each output voltage. In some examples, the server 106 or BMC measures input voltage and current and output voltage and current for the power supply 108 and the measurement module 202 receives voltage and current measurements from the server 108 or BMC.

As used herein, the term "load" describes the power being supplied by the power supply 108 (i.e., output power) to a load relative to the maximum power output rating of the power supply. The maximum power output rating is determined and provided by the manufacturer. In some examples, the load of the power supply 108 is expressed as a percentage. In some examples, at a given time, the power supply may supply 100 watts of power, and the maximum power output rating for the power supply 108 may be 500 watts and. The load may then be expressed as a 20% load. Where the power supply 108 includes multiple outputs, such as when the power supply 108 provides multiple output voltages, each output may have a different and/or separate maximum power.

In some examples, the time interval is any suitable time interval for the measurement module 202 to take measurements at loads spanning across a desired range. For example, the desired range is from zero to 100%. In other examples, the desired range is more narrow, such as from 20% to 80%. In some examples, the desired range is a range of loads at which the baseline measurement module 302 has collected input power and output power data. For example, the baseline measurement module 302 collects input power and output power data only in the range between 11% and 65%. In such examples, the desired range for the measurement module 202 is set to between 11% and 65%.

In some examples, the time interval is a set time interval, such as one day or one week. In some examples, the time interval is a set time interval after powering on the power supply 108, such as within an hour of powering on the power supply 108. The measurement module 202, in some embodiments, begins to measure input power and output power when a user turns the power supply 108 on.

In other examples, the measurement module 202 is configured to measure the input power and output power until the measurement module 202 has measured a desired quantity of input power and output power values for each of the loads within the desired range. For example, the measurement module 202 measures four input power and four output power values at each of the loads within the desired range. In some examples, "each of the loads within the desired range" includes discreet values of loads within the desired range. If the desired range is zero to 100%, "each of the loads within the desired range" includes loads of zero percent, 1%, 2%, 3%, . . . , 100%. In some embodiments, actual measurements are placed in discrete loads to be measured. In some examples, an actual power measurement may be 1.2% and may be rounded down to 1%, where another power measurement may be 1.7% and may be rounded up to 2%.

The calculation module 204, in some embodiments, is configured to calculate, for each of the plurality of loads, a power supply 108 efficiency. Each power supply efficiency is calculated using input power and output power measured for the load. The calculated power supply efficiency of a given load is approximately equivalent to the quotient of the output power and the input power for that load. In some examples, the calculation module 204 expresses the calculated power supply efficiency as a percentage. In other examples, the calculation module 204 expresses the calculated power supply efficiency as a numerical value between zero and one. In some examples, the measurement module 202 may measure an input power of 500 watts at a given load. The measurement module 202 may then measure an output power of 400 watts at the given load. The calculation module 204 determines, based on the measured input power and measured output power, that the power supply efficiency at that load is 80% or 0.80. In some examples, the power supply efficiency calculations of the calculation module 204 form a load-efficiency function, such as the efficiency function 506 shown in FIG. 5.

Figure 3:
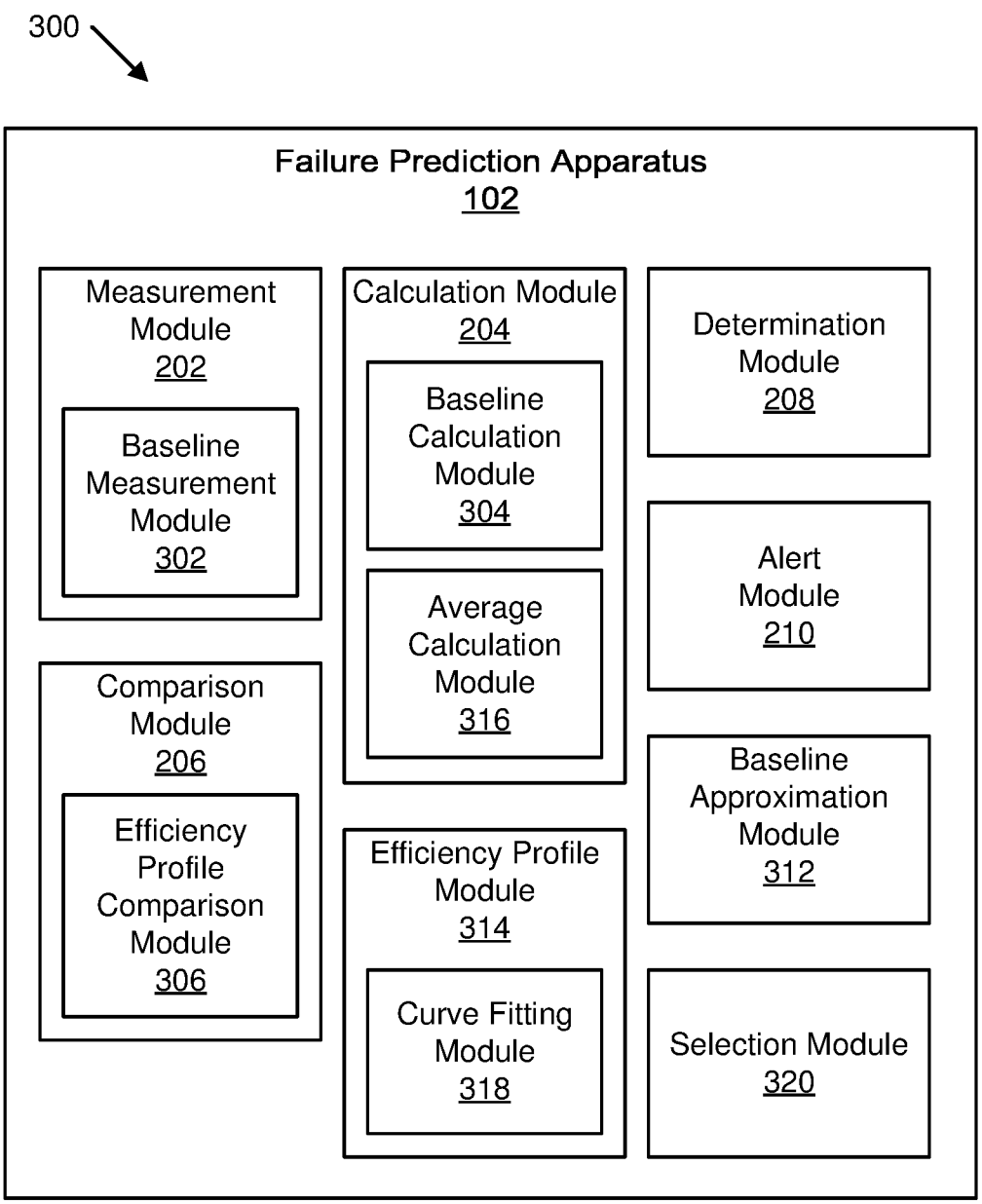
FIG. 3 is a schematic block diagram of another apparatus for predictive power supply failure detection, according to various embodiments.

The comparison module 206, in some embodiments, is configured to compare, for the time interval, each calculated power supply efficiency at a load of the plurality of loads with a baseline power supply efficiency of the power supply 108 at a corresponding load. In some examples, the baseline power supply efficiency is a power supply efficiency on a baseline power supply efficiency function, such as the baseline power supply efficiency function 504 shown in FIG. 5. In some examples, the baseline power supply efficiency is supplied by a manufacturer. In other examples, as shown in FIG. 3, the apparatus 102 includes a baseline measurement module 302 and a baseline calculation module 304 configured to calculate a baseline power supply efficiency for each of a plurality of loads. In some embodiments, the baseline power supply efficiency is expressed as a function and the comparison module 206 uses the function for comparisons. In other embodiments, the baseline power supply efficiency is expressed as a table, list, or other data structure with loads and corresponding discrete efficiency points.

In some embodiments, the comparison module 206 compares a calculated power supply efficiency to a corresponding baseline power supply efficiency for loads where the measurement module 202 measured voltage and current. For example, the measurement module 202 may have measured input power and output power at loads of 17%, 36%, 38%, 55%, 61%, 67%, and 78% and the comparison module 206 compares a calculated power supply efficiency at 17% load with a baseline power supply efficiency of 17% load, compares a calculated power supply efficiency at 36% load with a baseline power supply efficiency of 36% load, etc. until all calculated power supply efficiencies are compared.

In other embodiments, the comparison module 206, selects calculated power supply efficiencies to compare with corresponding baseline power supply efficiencies based on predetermined values. In some examples, the predetermined values may be within a range of 15% load to 85% load and at 5% increments. In the example, the examples, the comparison module 206 uses calculated power supply efficiencies that are either from input and output power measurements and/or from interpolated input and output power values. For example, the measurement module 202 may have measured input and output power at 24% and 27% and may calculate input and output power at 25% from the measured 24% and 27% measured input and output power values. In various embodiments, interpolation may include linear interpolation, curve fitting, etc. Selection of loads is described in more detail below with regard to the selection module 320 of FIG. 3 and interpolation and curve fitting are described in more detail below with regard to the curve fitting module 318 of FIG. 3. One of skill in the art will recognize other ways for the comparison module 206 to select loads for comparison of efficiencies and other ways to cover a desired range of efficiencies.

In some examples, the comparison module 206 is configured to compare the calculated power supply efficiency to the baseline power supply efficiency at a given frequency. In some examples, the frequency is selected by the user of the server 106. In other examples, the frequency is pre-determined by a manufacturer of the server 106. For example, the comparison module 206 compares calculated power supply efficiencies to baseline power supply efficiencies on a monthly basis. In such embodiments, the apparatus 102 initiates input power and output power measurements through measurement module 202 upon determining that the power supply 108 is due for another comparison to the baseline.

In some examples, after the comparison module 206 compares the calculated power supply efficiencies to the baseline power supply efficiencies, the server continues to store the baseline power supply efficiencies in the storage 103, but the server 106 does not store the calculated power supply efficiencies. During a subsequent time interval, the measurement module 202 measures subsequent input power and output power values for the power supply 108. The calculation module 204 calculates subsequent power supply efficiencies of the power supply 108 for that time interval, and the comparison module 206 compares the subsequent power supply efficiencies to the baseline power supply efficiencies.

The determination module 208 is, in some embodiments, configured to determine, based on the comparison, that a difference between a calculated power supply efficiency and a corresponding baseline power supply efficiency is above an efficiency threshold. For example, the determination module 208 determines that the calculated power supply efficiency is 5% less than the baseline power supply efficiency. The efficiency threshold is 10%, so the determination module 208 determines that the power supply efficiency is within an acceptable threshold of the baseline efficiency. In another example, the difference between the power supply efficiency and the baseline efficiency is also 5%. However, the efficiency threshold is 2%, so the determination module 208 determines that the power supply efficiency is less than the baseline power supply efficiency.

In some embodiments, the efficiency threshold changes for different loading conditions. For example, the efficiency threshold at 15% power may be different than the efficiency threshold at 70% power. In the embodiments, the determination module 208 uses an appropriate efficiency threshold for the load value being compared by the comparison module 206.

In some examples, determining that the difference between the calculated power supply efficiency and the baseline power supply efficiency is greater than an efficiency threshold indicates potential future failure of the power supply 108. In some examples, the determination module 208 determines a potential power supply failure based at least in part on the difference between the baseline power supply efficiency and the calculated power supply efficiency and/or a quantity of differences between the baseline power supply efficiency and calculated power supply efficiency that are above the efficiency threshold. The quantity of differences is above an efficiency count threshold.

The alert module 210, in some embodiments, is configured to transmit an alert in response to the determining done by the determination module 208. For example, the alert module 210 transmits an alert to a display of the server 106 indicating a potential future power supply failure. The alert, in some embodiments, includes information such as one or more differences between the baseline power supply efficiency and the calculated power supply efficiencies that exceeded an efficiency threshold, corresponding load values, etc. In some embodiments, the alert includes differences between the calculated power supply efficiencies and the baseline power supply efficiencies for a range of loads. In other embodiments, the alert includes a diagram illustrating calculated power supply efficiencies, baseline power supply efficiencies, highlighting of loads and efficiencies where the difference exceeded the efficiency threshold, and the like.

In some examples, the alert module 210 is also configured to transmit a message to another component of the server 106, where the message may include a command to take safety precautions, such as to evacuate the load from the power supply 108. In some examples, the server 106 is connected to a remote server, and the alert module 210 is configured to transmit an alert indicating potential future failure of the power supply 108 to the remote server. In some examples, the remote server responds to the alert by transferring load from the server 106 to another server. For example, the remote server determines that another server is capable of performing a workflow that the server 106 is currently performing and/or scheduled to perform and transfers that workflow to another server. The other server is, for example, another server in data center of servers.

In some examples, the apparatus 102 is further configured to select an action to take after the alert module 210 transmits the alert. For example, the apparatus 102 determines an action to take based on input from the user. Actions include, for example, any combination of: powering off the power supply 108, submitting an order for a replacement power supply, increasing or decreasing the frequency at which the comparison module 206 compares the calculated efficiency to the baseline efficiency, and the like, and/or any combination thereof.

FIG. 3 is a schematic block diagram of another apparatus 300 for predictive power supply failure detection, according to various embodiments. The apparatus 300 includes a failure prediction apparatus 102 as shown in FIGS. 1-2. The apparatus 300 includes a measurement module 202, a calculation module 204, a comparison module 206, a determination module 208, and an alert module 210, which are substantially similar to those described above with regards to the apparatus 200 of FIG. 2. In various embodiments, the apparatus 300 includes a baseline measurement module 302, a baseline calculation module 304, an efficiency profile comparison module 306, a baseline approximation module 312, an efficiency profile module 314, an average calculation module 316, a curve fitting module 318, and/or a selection module 320, which are described below. In some embodiments, the apparatus 300 is implemented in a similar way as the apparatus 200 of FIG. 2.

In some embodiments, the measurement module 202 includes a baseline measurement module 302 configured to, during a prior time interval, measure baseline input power and baseline output power for each of the plurality of loads of the power supply 108. For example, the baseline measurement module 302 measures baseline input power and baseline output power using similar methods as described in connection with the measurement module 202 of FIG. 2.

In some embodiments, the calculation module 204 includes a baseline calculation module 304 configured to, for each of the plurality of loads, calculate the baseline power supply efficiency. Each baseline power supply efficiency is calculated using the baseline input power and baseline output power measured for the load by the baseline measurement module 302. For example, the baseline calculation module 304 calculates the baseline power supply efficiency using similar methods as those described above in connection with the calculation module 204.

In some examples, the baseline calculation module 304 is configured to store the baseline power supply efficiencies for future reference (e.g., for the comparison module 206 to compare power supply efficiencies to the baseline power supply efficiencies). The baseline measurement module 302 initiates measuring the baseline input and output power values within a given time frame after a new power supply 108 is inserted into the server 106. In various examples, the baseline measurement module 302 initiates measurements within twenty-four hours of the new power supply 108 being inserted into the server 106, just after power on, right after replacement of the power supply 108, etc. In some embodiments, the baseline measurement module 302 determines that the baseline measurement module 302 has measured baseline input power and baseline output power values for a sufficient quantity of loads within a range of loads and concludes the measuring. In other embodiments, the baseline measurement module 302 initiates various loading conditions to get adequate measurements to populate a baseline power supply efficiency. One of skill in the art will recognize other times for the baseline measurement module 302 to measure input and output power of the power supply 108 and other ways to obtain enough measurements to create and adequate baseline power supply efficiency.

In some examples, each of the plurality of loads are within a range having a minimum load and maximum load. For example, the minimum load is zero, and the maximum load is 100%. In another example, the minimum load is 20%, and the maximum load is 80%. In some embodiments, the apparatus 300 includes an efficiency profile module 314 configured to create an approximated power supply efficiency profile for a range from the calculated power supplies efficiencies calculated for each of the plurality of loads throughout the range. In some examples, the efficiency profile module 314 is further configured to create approximate power supply efficiencies between at least some of the loads of the plurality of loads. In some examples, the efficiency profile includes an efficiency function similar to the efficiency function of 506 of FIG. 5.

In some examples, the efficiency profile module 314 includes a curve fitting module 318 configured to use a curve fitting technique to create the approximated power supply efficiencies for the approximate power supply efficiency profile based on the calculated power supply efficiencies. In some examples, the curve fitting module 318 is also configured to use a curve fitting technique to create the approximated baseline power supply efficiencies for a baseline power supply efficiency profile.

In some examples, the curve fitting module 318 constructs a power supply efficiency versus load curve 506 that has a best fit to the calculated power supply efficiency versus load data points 508. For example, the curve fitting module 318 uses interpolation, smoothing, or other curve fitting technique to construct the curve. One of skill in the art will recognize appropriate curve fitting techniques that the curve fitting module 318 may use to create a power supply efficiency curve.

In some embodiments, the apparatus 300 includes an efficiency profile comparison module 306 configured to compare calculated power supply efficiencies from an approximated power supply efficiency profile, such as the approximated power supply efficiency profile from the efficiency profile module 314, with corresponding efficiencies from the baseline power supply efficiency of the power supply 108 at corresponding loads. In some examples, the efficiency profile comparison module 306 is further configured to compare at least some approximate power supply efficiencies from the approximated power supply efficiency profile with corresponding efficiencies from baseline power supply efficiency. For example, the efficiency profile comparison module 306 may use calculated and/or baseline power supply efficiencies from measured input and output power and/or some approximated power supply efficiency values.

In some examples, the alert module 210 is configured to transmit an alert in response to determining that an amount of differences between a power supply efficiency profile and a corresponding baseline power supply efficiency is above an efficiency count threshold. In some examples, the alert module 210 is configured to transmit an alert in response to determining that an amount of differences between a calculated power supply efficiency and an approximated baseline efficiency (e.g., an approximated baseline efficiency of the baseline efficiency function 504) is above an efficiency count threshold. In some examples, the user sets the efficiency count threshold by inputting it into the server 106. In other examples, the server 106 determines the efficiency count threshold based on information received from the manufacturer of the power supply 108. The alert module 210 transmits an alert in response to determining that: (i) differences between a calculated baseline power supply efficiency from the baseline calculation module 304 and calculated and/or approximated power supply efficiency from the calculation module 204 and/or the efficiency profile module 314 are greater than an efficiency threshold difference; and (ii) the quantity of those differences is equal to or greater than an efficiency count threshold.

In some embodiments, the apparatus 300 includes a selection module 320 configured to select calculated power supply efficiencies of the approximated power supply efficiency profile at a selected interval along the approximated power supply efficiency profile. The selected calculated power supply efficiencies include a power supply efficiency corresponding to a load of the plurality of loads within the range and/or an approximate calculated power supply efficiency. In some examples, the selection module 320 selects an interval of 40% to 80% load. The selection module 320 then selects power supply efficiencies of the approximated power supply efficiency profile between 40% and 80% load. In some examples, the selection module 320 selects each of the power supply efficiencies between 40% and 80% load that do not appear to be outliers.

Figure 7:
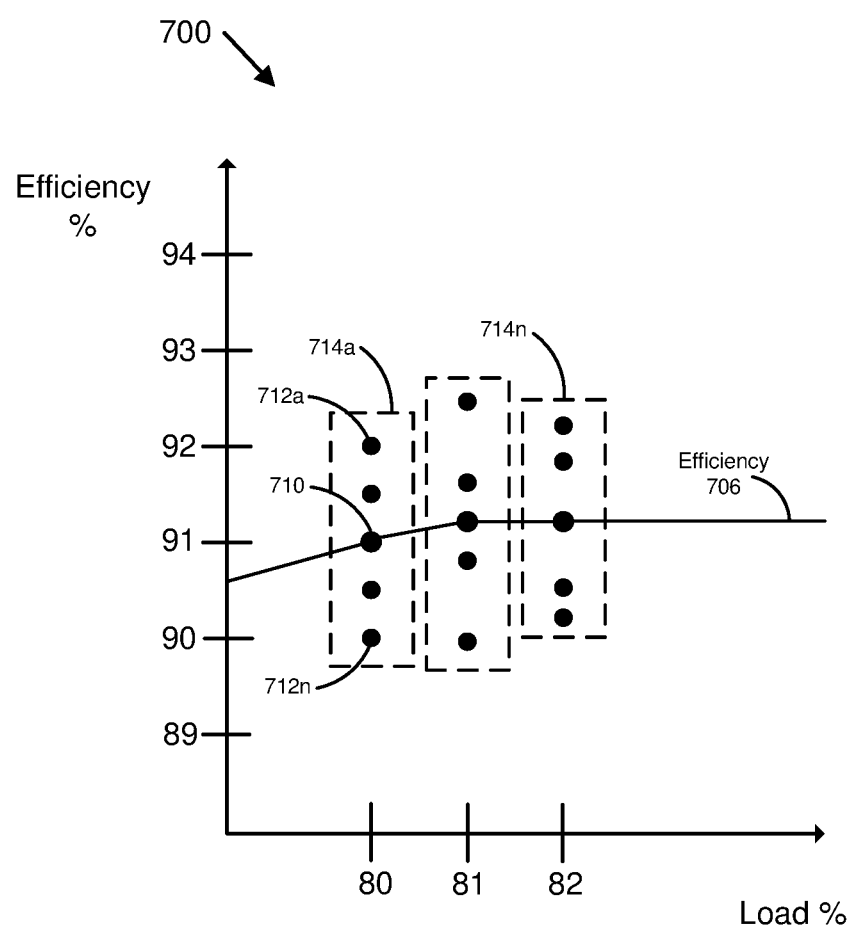
FIG. 7 is a diagram illustrating efficiency versus load for a power supply with multiple efficiency values power load value.

In some examples, the measurement module 202 is further configured to measure, during the time interval, a plurality of input power values and a plurality of output power values for each of the plurality of loads. In some examples, the calculation module 204 is configured to calculate a plurality of power supply efficiencies for each of the plurality of loads. Each power supply efficiency is based on one of the input power values and a corresponding one of the output power values. For example, as shown in FIG. 7, the calculation module 204 calculates a plurality 714a of power supply efficiencies 712a, . . . , 712n at an 80% load and a plurality 714n of power supply efficiencies at an 82% load. In some examples, each of the plurality 714a of power supply efficiencies 712a, . . . 712n represents a power supply efficiency of a different time within the time interval. For example, during a time interval of one week, use of the server 106 causes the load of the power supply 108 to vary.

FIG. 7 is a diagram 700 illustrating efficiency versus load for a power supply with multiple efficiency values 714a . . . 714n per load value. As shown in FIG. 7, in some examples, the measurement module measures a plurality of values at each of the loads, which results in the calculation module 204 calculating a plurality 712 of power supply efficiency values at that load. The average calculation module 316 calculates an average 710 of the plurality of efficiencies 714 for each load. Although FIG. 7 shows four efficiency levels 712 at each of the loads 80%, 81%, and 82% and an average 710 for each of the loads, examples of the present disclosure include any quantity of efficiency values 712 at each load and are not limited to four efficiency levels 712.

In some embodiments, the calculation module 204 includes an average calculation module 316 configured to calculate, for each of the power supply loads, an average input power and an average output power for the power supply. The calculated power supply efficiency is calculated using the average input power and the average output power for the power supply. In other examples, the calculated power supply efficiency that the comparison module 206 compares to the baseline power supply efficiency for a given load is an average of a plurality of power supply efficiencies calculated for that load. The average calculation module 316, in such embodiments, is configured to calculate an average power supply efficiency of the plurality of power supply efficiencies. For example, as shown in FIG. 7, the calculation module 204 calculates a plurality 714a of power supply efficiencies 712a . . . 712n at a load of 80%. The average calculation module 316 calculates an average 710 of those efficiencies 712-a . . . 712n. The power supply efficiency function 706 (which is analogous to the power supply efficiency function 506 of FIG. 5) includes only the average efficiency 710 and not each of the other power supply efficiencies 712a, . . . 712n.

Figure 4:
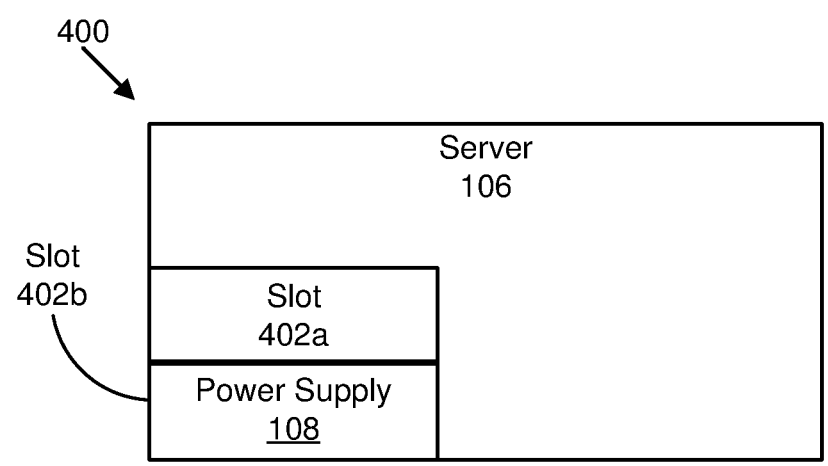
FIG. 4 is a schematic block diagram of a server, according to various embodiments.

FIG. 4 is a schematic block diagram 400 of a server 106, according to various embodiments. As shown in FIG. 4, the server 106 includes a number of slots 402a, 402b, which are referred to herein, individually or collectively, as "402." Each slot 402 is configured to receive a power supply 108.

As shown in FIG. 4, in some examples, the server 106 includes two or more slots 402. In some embodiments, only one power supply 108 is active in the server 106. In some examples, the power supply 108 is installed in slot 402b, and slot 402a remains empty. In other embodiments, the both slots 402a, 402b include a power supply 108, which is more expensive than having only one power supply 108 in slot 402b. Examples of the present disclosure help to facilitate predictive failure detection of the power supply 108, which reduces a need to constantly populate more than one slot in the server 106. For example, the alert module 210 alerts the user of a potential failure of the power supply 108, which helps to reduce reliance on a backup power supply that slot 402a would receive by providing the user time to replace the power supply 108 before a failure. As such, in some examples, the server 106 includes only a single power supply 108 rather than two power supplies 108.

Figure 5:
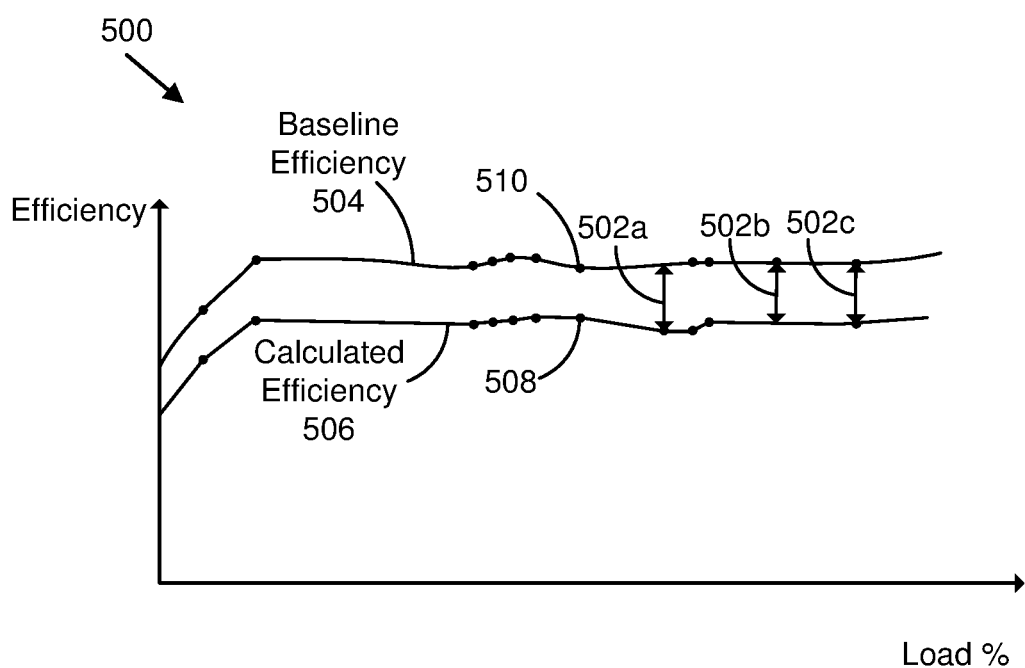
FIG. 5 is a diagram illustrating efficiency versus load for a power supply, according to various embodiments.

FIG. 5 is a diagram 500 illustrating efficiency versus load for a power supply, according to various embodiments. As shown in FIG. 5, a calculated efficiency function 506 includes calculated power supply efficiencies 508. In some examples, the efficiency profile module 314 of the apparatus 102 constructs the calculated efficiency function 506 based at least in part on calculated power supply efficiencies from the calculation module 204. In some embodiments, the calculated efficiency function 506 is further based on approximated power supply efficiencies. In some examples, the curve fitting module 318 approximates power supply efficiencies for loads for which the calculation module 204 has not calculated a power supply efficiency. The approximated power supply efficiencies are loads along the efficiency function 506 that do not correspond to a power supply efficiency datapoint 508.

As shown in FIG. 5, the baseline efficiency function 504 includes baseline efficiency points 510 that correspond to calculated baseline efficiencies. For example, the baseline efficiency points 510 represent baseline efficiencies from a manufacturer, from testing, etc. or calculated by the baseline calculation module 304 based on measurements from the baseline measurement module 302 for that load. The baseline efficiency function 504, in some embodiments, includes approximated baseline efficiencies from the baseline approximation module 312. In other embodiments, the baseline efficiency function 504 is from a table, database, etc. with baseline efficiency points 510 for various loads. In some examples, the baseline efficiency function 504 is created in part from baseline efficiency points 510, and approximated baseline efficiencies are efficiency levels.

In some embodiments, the comparison module 206 and/or the determination module 208 determines a difference 502c between a calculated efficiency 508 and a calculated baseline efficiency point 510. In some examples, the alert module 210 transmitting the alert is at least in part in response to the determination module 208 determining that the difference 502c is greater than a threshold efficiency.

In some embodiments, the comparison module 206, efficiency profile comparison module 306, and/or determination module 208 determine a difference 502a between the calculated power supply efficiency 508 and the baseline efficiency function 504 at the corresponding load (e.g., 510). The baseline efficiency function 504 at the corresponding load includes an approximated baseline efficiency. The comparison module 206, efficiency profile comparison module 306, and/or determination module 208 determine a difference 502 between an approximated efficiency of the efficiency function 506 and a baseline efficiency point 510 of the baseline efficiency function 504. In some examples, rather than the baseline calculation module 304 calculating the baseline efficiency function 504, the server 106 receives the baseline efficiency function 504 from a manufacturer of the power supply 108, is based on testing of the power supply 108, etc.

Figure 6:
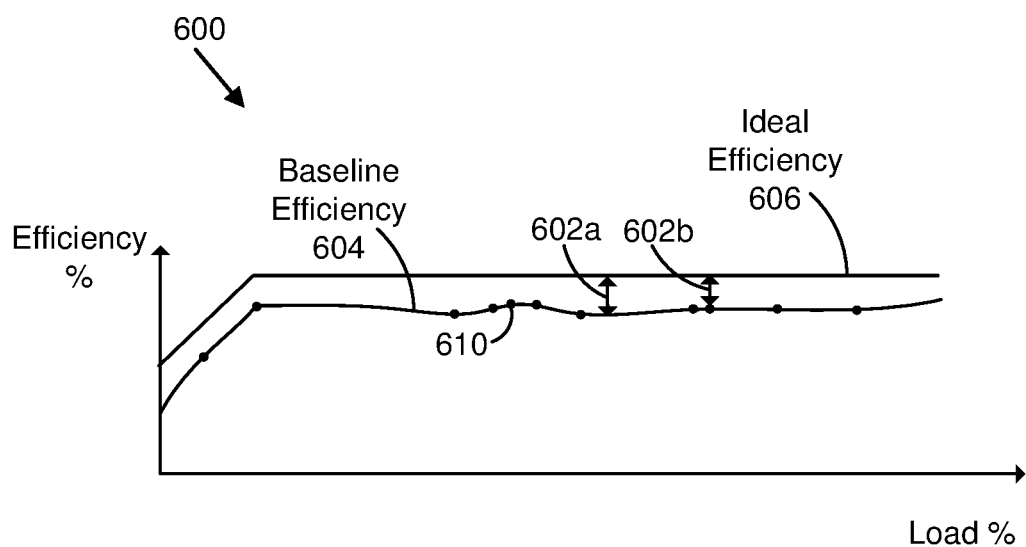
FIG. 6 is a diagram illustrating efficiency versus load for a power supply and an ideal efficiency versus load for the power supply, according to various embodiments.

FIG. 6 is a diagram 600 illustrating efficiency versus load for a power supply 108 and an ideal efficiency versus load for the power supply 108, according to various embodiments. The diagram 600 includes a baseline efficiency function 604 and an ideal efficiency function 606.

In some examples, the baseline efficiency function 604 is analogous to the baseline efficiency function 504 of FIG. 5. As shown in FIG. 6, the baseline efficiency function 604 includes data points 610 of a baseline efficiency measured and calculated for a power supply 108. Baseline efficiency data points 610 include any efficiency data points which the comparison module 204 compares to an efficiency of a subsequent time interval for that power supply 108. In some examples, the baseline efficiency function 604 includes approximated baseline efficiencies for each of the loads in a range of loads, and the baseline approximation module 312 determines the approximations based at least in part on the baseline efficiency data points 610.

The ideal efficiency function 606 represents an ideal efficiency level for the power supply 108 at each of the plurality of loads. In some examples, the manufacturer provides the ideal efficiency function 606. In some embodiments, the ideal baseline efficiency function 606 is an equation that produces a baseline efficiency value for an inputted load. The apparatus 102 determines the baseline efficiency function 604 and compares the baseline efficiency 604 to the ideal efficiency function 606. For example, the apparatus 102 determines a difference 602b between a baseline efficiency datapoint 610 and the ideal efficiency 606 at that load. In another example, the apparatus 102 determines a difference 602a between an approximated baseline efficiency function 604 and the idea efficiency 606.

The apparatus 102 determines that a difference 602a and/or 602b is greater than a threshold difference. In response to determining that the difference 602a and/or 602b is greater than the threshold difference, the alert module 210 transmits an alert. The alert includes a notification that the power supply 108 is performing below the ideal efficiency 606. In some examples, the apparatus 102 determines that a quantity of differences 602a and/or 602b exceeds a threshold count, and the alert module 210 transmits the alert at least partially in response.

In some examples, the alert module 210 transmits an alert that contains an estimate of when the power supply will fail. The apparatus 102 estimates when the power supply 108 will fail based at least in part on the differences 602a, 602b and/or the quantity of differences 602a, 602b that exceed the efficiency threshold. For example, a higher quantity of differences 602a, 602b that are above the efficiency threshold corresponds to a prediction that the power supply 108 will fail sooner.

Figure 8:
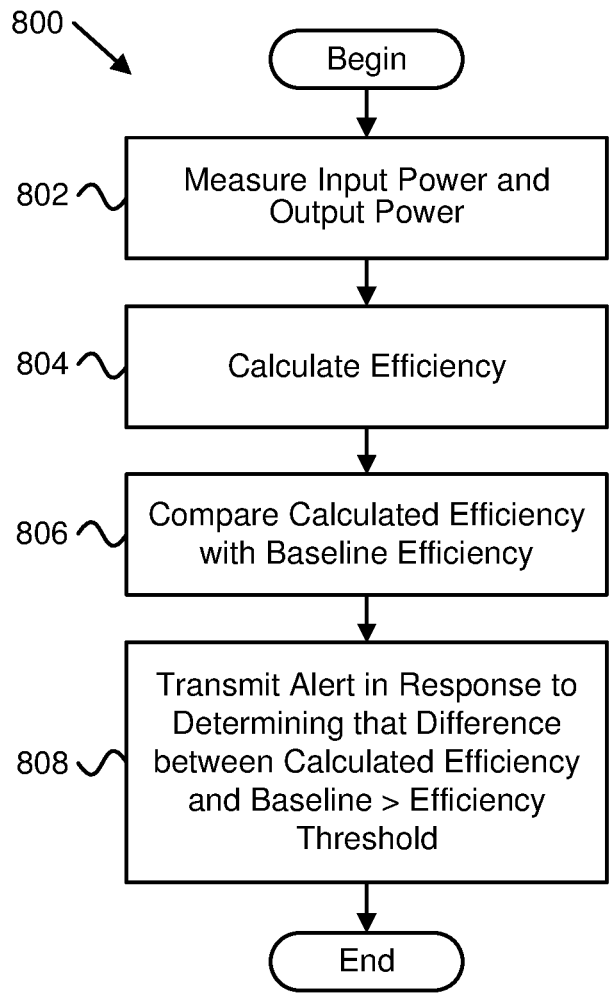
FIG. 8 is a schematic flow chart diagram illustrating a method for predictive power supply failure detection, according to various embodiments.

FIG. 8 is a schematic flow chart diagram illustrating a method 800 for predictive power supply failure detection, according to various embodiments. The method 800 begins and measures 802, during a time interval, input power and output power for each of a plurality of loads of a power supply 108. The method 800 calculates 804, for each of the plurality of loads, a power supply efficiency. Each power supply efficiency is calculated using the input power and output power measured for the load. The method 800 compares 806, for the time interval, a calculated power supply efficiency at a load of the plurality of loads with a baseline power supply efficiency of the power supply 108 at a corresponding load. The method 800 transmits 808 an alert in response to determining, based on the comparing, that a difference between a calculated power supply efficiency and a corresponding baseline power supply efficiency is above an efficiency threshold, and the method 800 ends. In various embodiments, all or a portion of the method 800 is implemented using the measurement module 202, the calculation module 204, the comparison module 206, the determination module 208, and/or the alert module 210.

Figure 9:
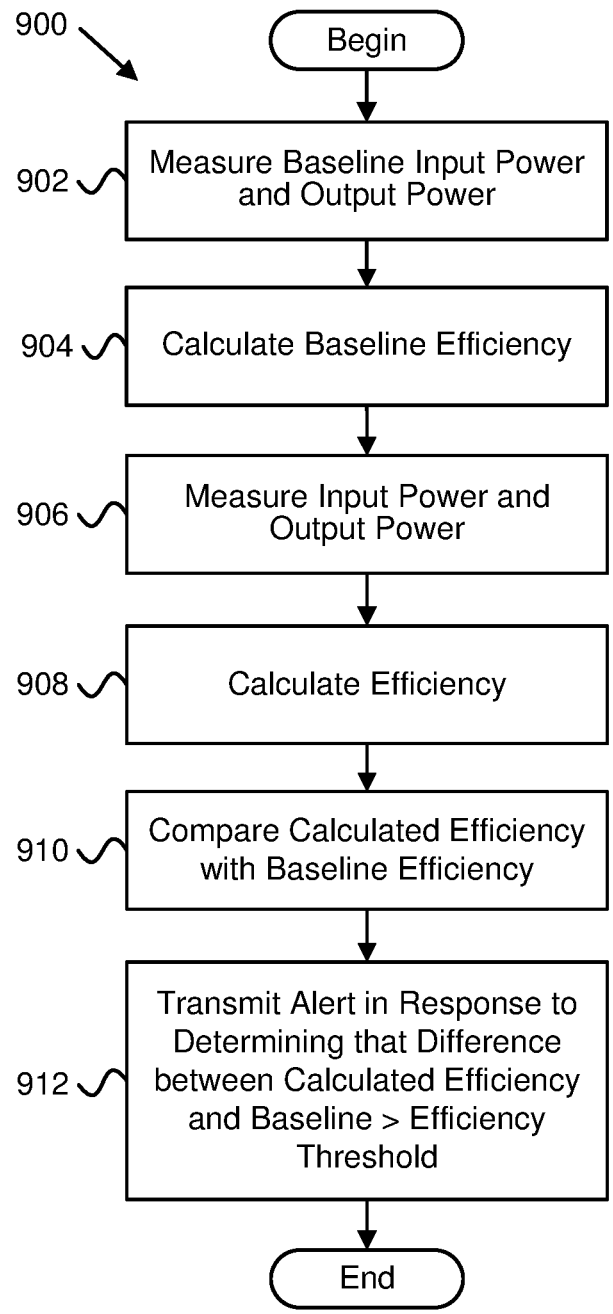
FIG. 9 is a schematic flow chart diagram illustrating a method for predictive power supply failure detection based on a calculated baseline efficiency, according to various embodiments.

FIG. 9 is a schematic flow chart diagram illustrating a method 900 for predictive power supply failure detection based on a calculated baseline efficiency, according to various embodiments. The method 900 begins and measures 902, during an initial time interval, baseline input power and baseline output power for each of the plurality of loads of the power supply 108. The initial time interval is some time when the power supply 108 is first turned on, is commissioned, after a power supply 108 has been replaced, etc. and is prior to a time interval used for determining a calculated power supply efficiency. The method 900 calculates 904, for each of the plurality of loads, the baseline power supply efficiency. In some examples, the baseline power supply efficiency is calculated using the baseline input power and baseline output power measured for various loads.

The method 900 measures 906, during a time interval, input power and output power for each of a plurality of loads of a power supply 108. The method 900 calculates 908, for each of the plurality of loads, a power supply efficiency. Each power supply efficiency is calculated using the input power and output power measured for the load. The method 900 compares 910, for the time interval, a calculated power supply efficiency at a load of the plurality of loads with a baseline power supply efficiency of the power supply 108 at a corresponding load. The method 900 transmits 912 an alert in response to determining, based on the comparing, that a difference between a calculated power supply efficiency and a corresponding baseline power supply efficiency is above an efficiency threshold, and the method 900 ends. In various embodiments, all or a portion of the method 900 is implemented using the measurement module 202, the calculation module 204, the comparison module 206, the determination module 208, the alert module 210, the baseline measurement module 302, and/or the baseline calculation module 304.

Figure 10:
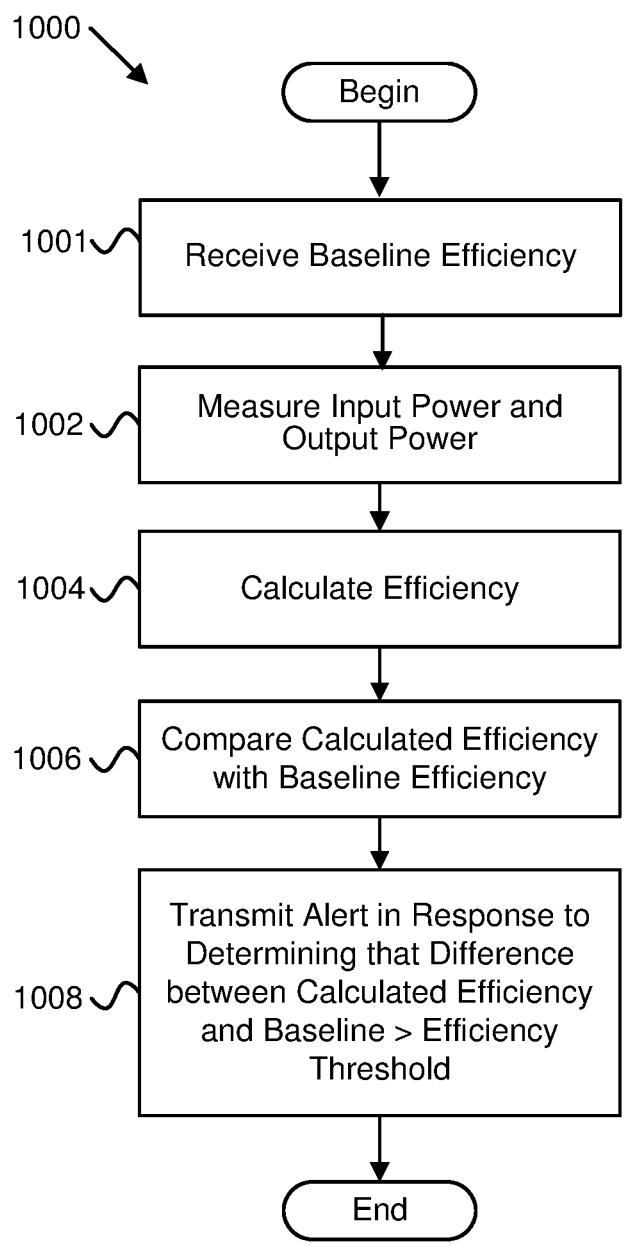
FIG. 10 is a schematic flow chart diagram illustrating a method for predictive power supply failure detection based on a received baseline efficiency, according to various embodiments.

FIG. 10 is a schematic flow chart diagram illustrating a method 1000 for predictive power supply failure detection based on a received baseline efficiency, according to various embodiments. The method 1000 begins and receives 1001 the baseline power supply efficiency from a manufacturer of the power supply 108. The method 1000 measures 1002, during a time interval, input power and output power for each of a plurality of loads of a power supply 108. The method 1000 calculates 1004, for each of the plurality of loads, a power supply efficiency. Each power supply efficiency is calculated using the input power and output power measured for the load. The method 1000 compares 1006, for the time interval, a calculated power supply efficiency at a load of the plurality of loads with a baseline power supply efficiency of the power supply 108 at a corresponding load. The method 1000 transmits 1008 an alert in response to determining, based on the comparing, that a difference between a calculated power supply efficiency and a corresponding baseline power supply efficiency is above an efficiency threshold, and the method 1000 ends. In various embodiments, all or a portion of the method 1000 is implemented using the measurement module 202, the calculation module 204, the comparison module 206, the determination module 208, and/or the alert module 210.

Figure 11:
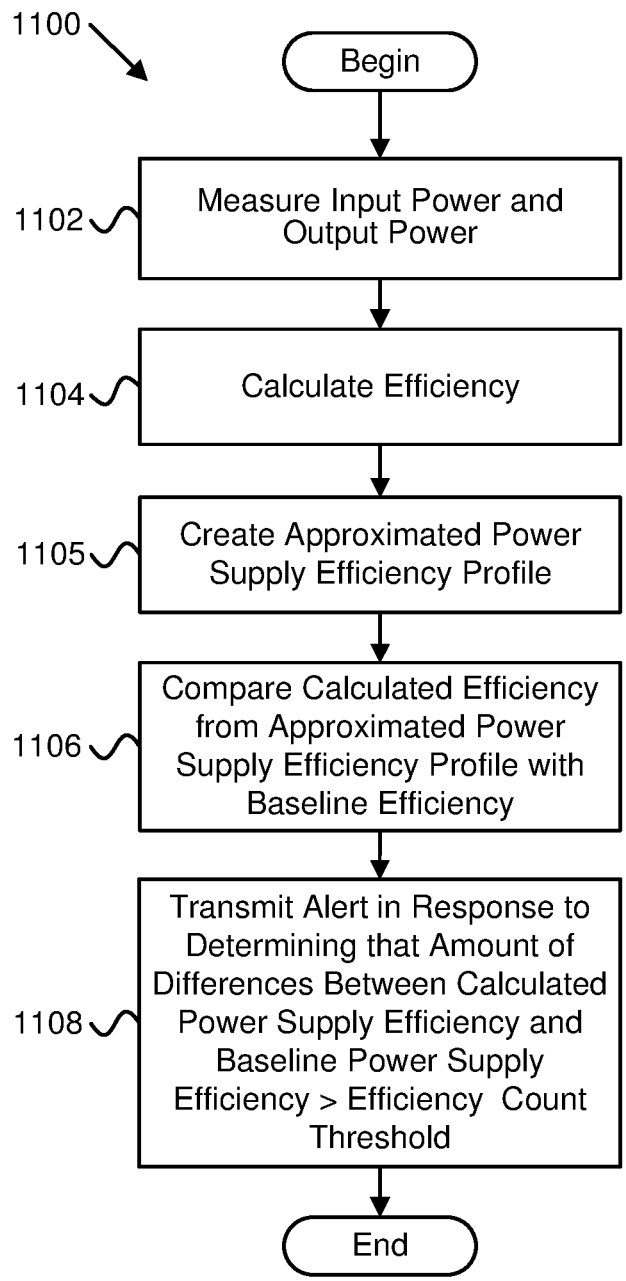
FIG. 11 is a schematic flow chart diagram illustrating a method for predictive power supply failure detection based on approximated power supply efficiency, according to various embodiments.

FIG. 11 is a schematic flow chart diagram illustrating another method 1100 for predictive power supply failure detection based on approximated power supply efficiency, according to various embodiments. The method 1100 begins and measures 1102, during a time interval, input power and output power for each of a plurality of loads of a power supply 108. The method 1100 calculates 1104, for each of the plurality of loads, a power supply efficiency. Each power supply efficiency is calculated using the input power and output power measured for the load.

In some examples, each of the plurality of loads are within a range having a minimum load and a maximum load. The method 1100 creates 1105 an approximated power supply efficiency profile for the range from the calculated power supply efficiencies calculated for each of the plurality of loads throughout the range. In some examples, creating 1105 the approximated power supply efficiency profile includes creating approximate power supply efficiencies between at least some of the loads of the plurality of loads.

In some examples, creating 1105 the approximated power supply efficiencies for the approximate power supply efficiency profile includes using a curve fitting technique based on the calculated power supply efficiencies. The method 1100 compares 1106 calculated power supply efficiencies from the approximated power supply efficiency profile with corresponding efficiencies from the baseline power supply efficiency of the power supply at corresponding loads. In some examples, comparing 1106 the calculated power supply efficiencies from the approximated power supply efficiency profile with corresponding efficiencies from the baseline power fully efficiency includes comparing at least some approximate power supply efficiencies from the approximated power supply efficiency profile with corresponding efficiencies from the baseline power supply efficiency.

In some examples, comparing 1106 the calculated power supply efficiencies from the approximated power supply efficiency profile with corresponding efficiencies from the baseline power supply efficiency of the power supply includes selecting calculated power supply efficiencies of the approximated power supply efficiency profile at a selected interval along the approximated power supply efficiency profile. The selected calculated power supply efficiencies include a power supply efficiency corresponding to a load of the plurality of loads within the range. The selected power supply efficiencies include an approximate calculated power supply efficiency.

The method 1100 includes transmitting 1108 an alert in response to determining, based on the comparing 1106, that an amount of differences between a calculated power supply efficiency of the approximated power supply efficiency profile and a corresponding baseline power supply efficiency is above an efficiency count threshold, and the method 1100 ends. Transmitting 1108 the alert is further in response to determining, based on the comparing 1106, that a difference between a predetermined quantity of calculated power supply efficiencies and a predetermined quantity of corresponding baseline power supply efficiencies is above the efficiency threshold. In various embodiments, all or a portion of the method 1100 is implemented using the measurement module 202, the calculation module 204, the comparison module 206, the determination module 208, efficiency profile module 314, efficiency profile comparison module 306, the curve fitting module 318, and/or the alert module 210.

Figure 12:
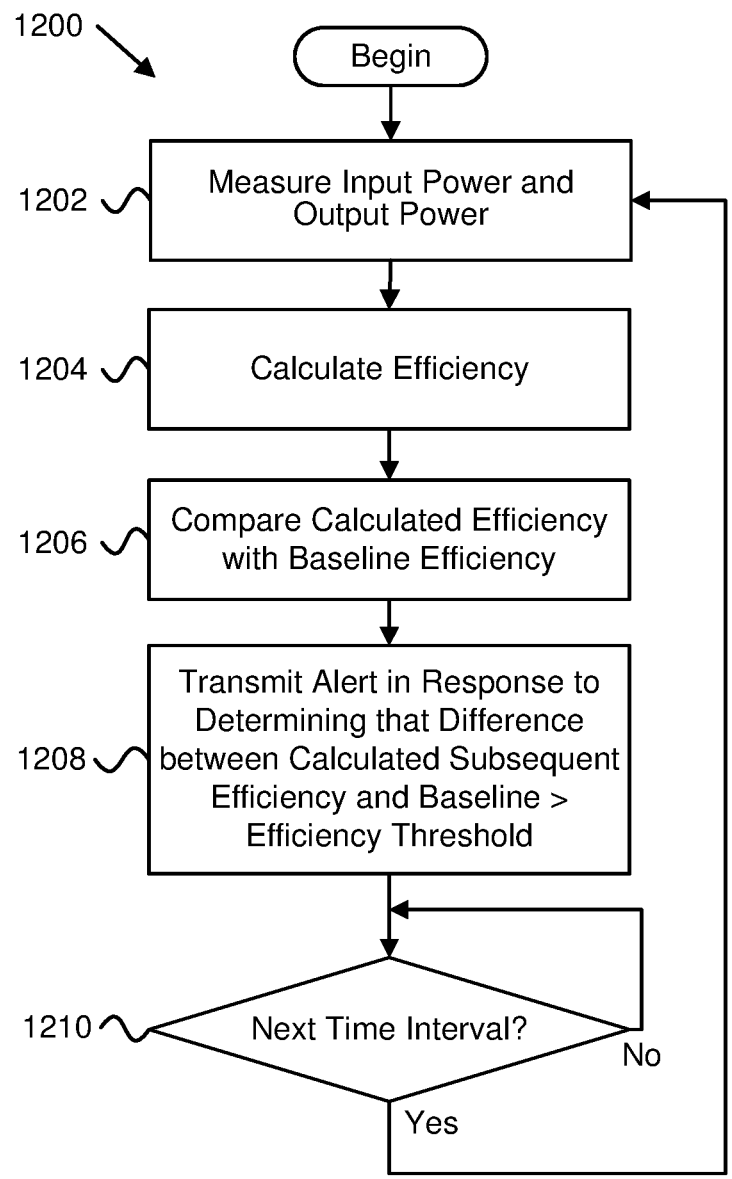
FIG. 12 is a schematic flow chart diagram illustrating a method for predictive power supply failure detection based on a comparison of calculated power supply efficiency and baseline power supply efficiency, according to various embodiments.

FIG. 12 is a schematic flow chart diagram illustrating another method 1200 for predictive power supply failure detection based on a comparison of calculated power supply efficiency and baseline power supply efficiency, according to various embodiments. The method 1200 begins and measures 1202, during a time interval, input power and output power for each of a plurality of loads of a power supply 108. The method 1200 calculates 1204, for each of the plurality of loads, a power supply efficiency. Each power supply efficiency is calculated using the input power and output power measured for the load. The method 1200 compares 1206, for the time interval, a calculated power supply efficiency at a load of the plurality of loads with a baseline power supply efficiency of the power supply 108 at a corresponding load.

The method 1200 determines 1210 if a next time interval has been reached. For example, where the power supply 108 is to be tested once a month, the next time interval would be one month after completion of steps 1202-1208. If the method 1200 determines 1210 that the next time interval has not been reached, the method 1200 returns and continues to determine 1210 if the next time interval has been reached. If the method 1200 determines that the next time interval has been reached, the method 1200 returns and measures input power and output power for the power supply 108. In various embodiments, all or a portion of the method 1200 is implemented using the measurement module 202, the calculation module 204, the comparison module 206, the determination module 208, the alert module 210, the baseline measurement module 302, the baseline calculation module 304, the efficiency profile comparison module 306, the average calculation module 316, and/or the curve fitting module 318.

Figure 13:
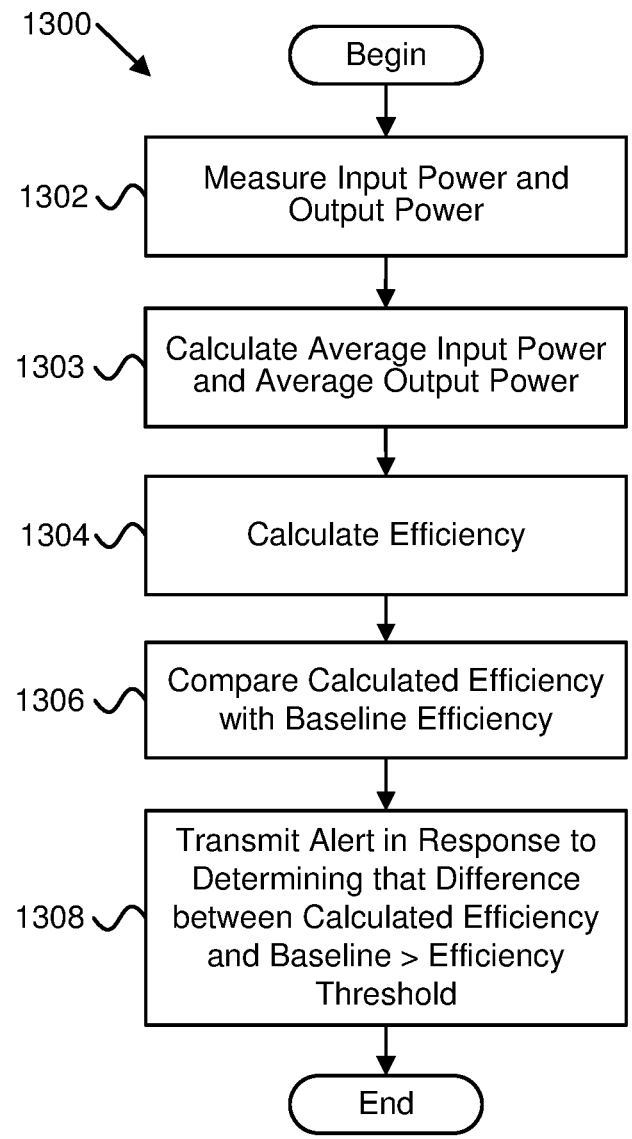
FIG. 13 is a schematic flow chart diagram illustrating a method for predictive power supply failure detection based on averaged input power and averaged output power of a power supply, according to various embodiments.

FIG. 13 is a schematic flow chart diagram illustrating a method 1300 for predictive power supply failure detection based on averaged input power and averaged output power of a power supply, according to various embodiments.

The method 1300 begins and measures 1302, during a time interval, input power and output power for each of a plurality of loads of a power supply 108. The measuring 1302 includes, during the time interval, a plurality of input power values and a plurality of output power values for each of the plurality of loads. The method 1300 calculates 1303, for each of the power supply loads, an average input power and an average output power for the power supply.

The method 1300 calculates 1304, for each of the plurality of loads, a power supply efficiency. Each power supply efficiency is calculated using the input power and output power measured for the load. The calculated power supply efficiency is calculated using the average input power and the average output power for the power supply. The method 1300 compares 1306, for the time interval, a calculated power supply efficiency at a load of the plurality of loads with a baseline power supply efficiency of the power supply 108 at a corresponding load. The method 1300 transmits 1308 an alert in response to determining, based on the comparing, that a difference between a calculated power supply efficiency and a corresponding baseline power supply efficiency is above an efficiency threshold, and the method 1300 ends. In various embodiments, all or a portion of the method 1300 is implemented using the measurement module 202, the calculation module 204, the comparison module 206, the determination module 208, the alert module 210, the baseline measurement module 302, the baseline calculation module 304, the efficiency profile comparison module 306, the efficiency profile module 314, the average calculation module 316, the curve fitting module 318, and/or the selection module 320.

As used herein, the term "approximation" refers to, for example, at least one of: interpolation, curve fitting, linear approximation, binomial approximation, quadratic approximation, and/or statistical models. The efficiency profile module 314 is configured to create efficiency profiles based on approximation.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   measuring, during a time interval, input power and output power for each of a plurality of loads of a power supply during operation of the power supply;
   calculating, for each of the plurality of loads, a power supply efficiency, each power supply efficiency calculated using the input power and output power measured for the load;
   comparing, for the time interval, a calculated power supply efficiency at a load of the plurality of loads with a baseline power supply efficiency of the power supply at a corresponding load, the baseline power supply efficiency comprising a past ideal power supply efficiency of the power supply; and
   transmitting an alert in response to determining, based on the comparing that the difference between the calculated power supply efficiency and the corresponding baseline power supply efficiency is above the efficiency threshold.

2. The method of claim 1, further comprising:
   measuring, during a prior time interval, baseline input power and baseline output power for each of the plurality of loads of the power supply; and
   calculating, for each of the plurality of loads, a baseline power supply efficiency, each baseline power supply efficiency calculated using the baseline input power and baseline output power measured for the load.

3. The method of claim 1, further comprising receiving the baseline power supply efficiency from a manufacturer of the power supply.

4. The method of claim 1, wherein each of the plurality of loads are within a range having a minimum load and a maximum load.

5. The method of claim 4, further comprising:
   creating an approximated power supply efficiency profile for the range from the calculated power supply efficiencies calculated for each of the plurality of loads throughout the range;
   comparing calculated power supply efficiencies from the approximated power supply efficiency profile with corresponding baseline power supply efficiencies of the power supply at corresponding loads; and
   transmitting an alert in response to determining that an amount of differences between a calculated power supply efficiency of the approximated power supply efficiency profile and a corresponding baseline power supply efficiency is above an efficiency count threshold.

6. The method of claim 5, wherein creating the approximated power supply efficiency profile comprises creating approximate power supply efficiencies between at least some of the loads of the plurality of loads and wherein comparing calculated power supply efficiencies from the approximated power supply efficiency profile with corresponding baseline power supply efficiencies comprises comparing at least some approximate power supply efficiencies from the approximated power supply efficiency profile with corresponding baseline power supply efficiencies.

7. The method of claim 5, wherein:
   comparing calculated power supply efficiencies from the approximated power supply efficiency profile with corresponding efficiencies from the baseline power supply efficiency of the power supply comprises selecting calculated power supply efficiencies of the approximated power supply efficiency profile at a selected interval along the approximated power supply efficiency profile; and
   the selected calculated power supply efficiencies comprise:
      a power supply efficiency corresponding to a load of the plurality of loads within the range; and/or
      an approximate calculated power supply efficiency.

8. The method of claim 5, wherein creating the approximated power supply efficiencies for the approximate power supply efficiency profile comprises using a curve fitting technique based on the calculated power supply efficiencies.

9. The method of claim 4, further comprising:
measuring, during a subsequent time interval, subsequent input power and subsequent output power for each of an additional plurality of loads of the power supply throughout the range;
calculating, for each of the additional plurality of loads, a subsequent power supply efficiency, each subsequent power supply efficiencies calculated using the subsequent input power and subsequent output power measured for the load;
comparing, for the subsequent time interval, each calculated subsequent power supply efficiency at a load of the additional plurality of loads with the baseline power supply efficiency of the power supply at a corresponding load; and
transmitting an alert in response to determining, based on the comparing, that a difference between an additional calculated power supply efficiency for the additional plurality of loads and a corresponding baseline power supply efficiency is above an efficiency threshold.

10. The method of claim 1, further comprising:
measuring, during the time interval, a plurality of input power values and a plurality of output power values for each of the plurality of loads; and
calculating, for each of the power supply loads, an average input power and an average output power for the power supply,
wherein the calculated power supply efficiency is calculated using the average input power and the average output power for the power supply.

11. The method of claim 1, wherein transmitting the alert is further in response to determining, based on the comparing, that a difference between a predetermined quantity of calculated power supply efficiencies and a predetermined quantity of corresponding baseline power supply efficiencies is above the efficiency threshold.

12. An apparatus comprising:
a measurement module configured to measure, during a time interval, input power and output power for each of a plurality of loads of a power supply during operation of the power supply;
a calculation module configured to calculate, for each of the plurality of loads, a power supply efficiency, each power supply efficiency calculated using the input power and output power measured for the load;
a comparison module configured to compare, for the time interval, each calculated power supply efficiency at a load of the plurality of loads with a baseline power supply efficiency of the power supply at a corresponding load, the baseline power supply efficiency comprising a past ideal power supply efficiency of the power supply;
a determination module configured to determine, based on the comparing, that a difference between a calculated power supply efficiency and a corresponding baseline power supply efficiency is above an efficiency threshold; and
an alert module configured to transmit an alert in response to the determining, based on the comparing, that the difference between the calculated power supply efficiency and the corresponding baseline power supply efficiency is above the efficiency threshold,
wherein at least a portion of said modules comprises hardware circuits, a programmable hardware device and/or code, the code stored on non-transitory computer readable storage media.

13. The apparatus of claim 12, further comprising:
a baseline measurement module configured to, during a prior time interval, measure baseline input power and baseline output power for each of the plurality of loads of the power supply; and
a baseline calculation module configured to, for each of the plurality of loads, calculate a baseline power supply efficiency, each baseline power supply efficiency calculated using the baseline input power and baseline output power measured for the load.

14. The apparatus of claim 12, wherein each of the plurality of loads are within a range having a minimum load and maximum load.

15. The apparatus of claim 14, further comprising:
an efficiency profile module configured to create an approximated power supply efficiency profile for the range from the calculated power supply efficiencies calculated for each of the plurality of loads throughout the range; and
an efficiency profile comparison module configured to compare calculated power supply efficiencies from the approximated power supply efficiency profile with corresponding efficiencies from the baseline power supply efficiency of the power supply at corresponding loads,
wherein the alert module is further configured to transmit an alert in response to determining that an amount of differences between a calculated power supply efficiency of the approximated power supply efficiency profile and a corresponding baseline power supply efficiency is above an efficiency count threshold.

16. The apparatus of claim 15, wherein:
the efficiency profile module is further configured to create approximate power supply efficiencies between at least some of the loads of the plurality of loads; and
the efficiency profile comparison module is further configured to compare at least some approximate power supply efficiencies from the approximated power supply efficiency profile with corresponding efficiencies from baseline power supply efficiency.

17. The apparatus of claim 16, further comprising:
a selection module configured to select calculated power supply efficiencies of the approximated power supply efficiency profile at a selected interval along the approximated power supply efficiency profile,
wherein the selected calculated power supply efficiencies comprise:
a power supply efficiency corresponding to a load of the plurality of loads within the range; and/or
an approximate calculated power supply efficiency.

18. The apparatus of claim 15, further comprising a curve fitting module configured to use a curve fitting technique to create the approximated power supply efficiencies for the approximate power supply efficiency profile based on the calculated power supply efficiencies.

19. The apparatus of claim 12, wherein:
the measurement module is further configured to measure, during the time interval, a plurality of input power values and a plurality of output power values for each of the plurality of loads;
the apparatus further comprises an average calculation module configured to calculate, for each of the power supply loads, an average input power and an average output power for the power supply; and
the calculated power supply efficiency is calculated using the average input power and the average output power for the power supply.

20. A system comprising:

a power supply; and a computing device comprising the power supply, the computing device comprising:

- a measurement module configured to measure, during a time interval, input power and output power for each of a plurality of loads of the power supply during operation of the power supply;
- a calculation module configured to calculate, for each of the plurality of loads, a power supply efficiency, each power supply efficiency calculated using the input power and output power measured for the load;
- a comparison module configured to compare, for the time interval, each calculated power supply efficiency at a load of the plurality of loads with a baseline power supply efficiency of the power supply at a corresponding load, the baseline power supply efficiency comprising a past ideal power supply efficiency of the power supply;
- a determination module configured to determine, based on the comparison, that a difference between a calculated power supply efficiency and a corresponding baseline power supply efficiency is above an efficiency threshold; and
- an alert module configured to transmit an alert in response to the determining, based on the comparing, that the difference between the calculated power supply efficiency and the corresponding baseline power supply efficiency is above the efficiency threshold, wherein at least a portion of said modules comprises hardware circuits, a programmable hardware device and/or code, the code stored on non-transitory computer readable storage media.

* * * * *